United States Patent
Bush

(10) Patent No.: US 7,493,398 B2
(45) Date of Patent: Feb. 17, 2009

(54) SHARED SOCKET CONNECTIONS FOR EFFICIENT DATA TRANSMISSION

(75) Inventor: Eric N. Bush, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 787 days.

(21) Appl. No.: 10/414,956

(22) Filed: Apr. 16, 2003

(65) Prior Publication Data

US 2004/0221059 A1  Nov. 4, 2004

(51) Int. Cl.
G06F 15/16 (2006.01)
H04J 15/00 (2006.01)
H04J 3/04 (2006.01)

(52) U.S. Cl. ........................ 709/227; 709/223; 709/226; 709/228; 370/464; 370/473; 370/535

(58) Field of Classification Search ......... 709/227–229, 709/232, 240, 201, 205, 222, 223–226, 217–219; 370/464, 473, 474, 535
See application file for complete search history.

(56) References Cited

U.S. PATENT DOCUMENTS

| | | | |
|---|---|---|---|
| 5,867,661 A * | 2/1999 | Bittinger et al. | |
| 5,999,974 A * | 12/1999 | Ratcliff et al. | |
| 6,067,557 A * | 5/2000 | Hegde | |
| 6,098,108 A * | 8/2000 | Sridhar et al. | 709/239 |
| 6,182,146 B1 * | 1/2001 | Graham-Cumming, Jr. | |
| 6,219,669 B1 * | 4/2001 | Haff et al. | |
| 6,324,582 B1 * | 11/2001 | Sridhar et al. | |
| 6,763,387 B1 * | 7/2004 | Hickey et al. | |
| 6,859,835 B1 * | 2/2005 | Hipp | 709/227 |
| 6,922,727 B2 * | 7/2005 | Banerjee | |
| 6,950,873 B2 * | 9/2005 | Jain et al. | |
| 6,956,854 B2 * | 10/2005 | Ganesh et al. | |
| 7,051,337 B2 * | 5/2006 | Srikantan et al. | |
| 2002/0052931 A1 * | 5/2002 | Peiffer et al. | |
| 2002/0065776 A1 * | 5/2002 | Calder et al. | |

OTHER PUBLICATIONS

W. R. Stevens, TCP/IP Illustrated, vol. I : The Protocols. New York: Addison-Wesley, Dec. 31, 1993.*
W. Richard Stevens, TCP/IP illustrated (vol. 1): the protocols, Addison-Wesley Longman Publishing Co., Inc., Boston, MA, 1993.*
Anthony Jones and Jim Ohlund, Network Programming for Microsoft Windows®, 2nd ed., Microsoft Press, Feb. 13, 2002 pp. 145-169.*
Reilley, Douglas. "Inside Server-Based Application." Microsoft Press, 2000.*

* cited by examiner

*Primary Examiner*—Ario Etienne
*Assistant Examiner*—Brendan Y Higa
(74) *Attorney, Agent, or Firm*—Workman Nydegger

(57) ABSTRACT

A system, method and data structures for allowing the sharing of a socket among multiple applications. Sockets that are opened as a result of a send or a receive are kept open and tracked for use with other communications. A shared sockets manager receives outgoing transmission requests to a destination machine and uses a shared socket if one is already open, otherwise the shared sockets manager opens a new socket. Sent data is multiplexed and routed via receive request registration, and demultiplexed upon receipt. The shared socket is closed if idle for too long via a negotiated closing process. High priority data may be sent via the socket ahead of other data, and the timers and priority handling mechanisms may be adjusted for each socket to tune the network machines as desired.

24 Claims, 8 Drawing Sheets

SHARED SOCKET CONNECTIONS FOR EFFICIENT DATA TRANSMISSION

FIELD OF THE INVENTION

The invention relates generally to computer systems and networks, and more particularly to network data transmission.

BACKGROUND OF THE INVENTION

In computer network communications, a sockets model may be used, in which the communication between two of the computers of the network is conceptually considered as taking place between two endpoints, or sockets. Typical sockets programs utilize a client/server approach to communications, in which a provider of a needed service is available to service requests from a client as the client needs them. In this model, the client creates a socket and establishes a connection to the server (assuming the server accepts) on a server-side socket. The client then communicates via the connection, using a communications protocol that the server supports. The client application closes the socket to terminate the connection when finished with the particular communication.

Although this model works very well, there is a substantial amount of overhead required to open a socket and establish a connection, and even more overhead when a secure connection is required. In general, the overhead results from some required handshaking, in which the client and server authenticate one another to some extent, depending on the level of security desired for this communication.

While this overhead is simply an accepted computing cost in many computing environments, in large networks having substantial numbers of transmissions flowing both ways, the amount of sockets-related overhead can lead to problems. For example, in a large network having thousands of machines, many events, alerts and performance monitoring data need to be transmitted, along with conventional network traffic to handle web page serving, file serving, web services, and so forth. In such networks, existing methods of data transmission can only scale to networks having machines numbering in the hundreds, in part because of sockets-related overhead.

As can be appreciated, any reduction in the amount of sockets-related overhead would be beneficial in improving network scalability.

SUMMARY OF THE INVENTION

Briefly, the present invention provides a system, method and data structures that implement an improved communication protocol and mechanisms for handling the transmission of data. Sockets that are opened as a result of a data send or receive are kept open for other communications. The open sockets are left open and tracked such that they may be shared among different sets of code (distinct processes and/or threads) that is running on the system. To share a socket, subsequent calls to send data to a destination result in a list of available connections being searched to locate a corresponding open socket to that destination. A new socket is opened only if an open socket is not found. Data sent to a given destination is multiplexed with the data of other processes and/or threads sending to that destination, routed via receive request registration, and demultiplexed upon receipt.

In general, each machine in the network abstracts socket management from the applications' or other components' processes and/or threads that use the sockets, such that a socket to any given other machine may be shared by the various processes and/or threads of a system. To this end, a shared sockets manager receives outgoing transmission requests to a destination machine and uses a shared socket if one is already open, otherwise the shared sockets manager opens a new socket. To determine whether a socket is open to a given machine or a new socket needs to be opened, the shared sockets manager tracks open sockets via an open sockets list, comprising a data structure for each open socket that identifies each open socket by destination machine along with other per-socket-related information. When the shared sockets manager opens a new connection to another machine, whether because of sending data to the other machine or receiving data from it, the shared sockets manager adds a data structure to the open sockets list, and keeps the socket open for awhile to allow the connection to be used for other communications with that other machine, including the data transmission of different sets of executing code.

Whenever the shared sockets manager receives further data to transmit, the shared sockets manager sorts the data by destination and multiplexes the data for each destination so that it can be sent on a shared socket for that destination. A header structure is added to the data to identify it relative to other data so that the transmitted data can be properly demultiplexed at the receiver, that is, received transmissions on a shared socket are demultiplexed so as to route them to the appropriate recipient set of executing code (process/thread) for which the transmission is destined. On each machine, there is thus a multiplexer and demultiplexer for handling transmissions sent and received and via shared sockets, respectively.

The shared socket remains open for a system's executing code to communicate with the other machine as long as the connection is needed. Unneeded connections are determined by an idle duration being reached, causing the sockets to be closed and removed from their respective lists. A timing mechanism that is reset whenever the socket is used is used to determine the idle time. A timeout process walks the open sockets list of data structures to check for connections that have not been used for a predetermined time, and if any idle connection is found, starts a process to close the corresponding socket.

The closing of the connection is negotiated between the machines, wherein in general, the close is initiated by the machine that established the connection. To this end, instead of closing the connection, the connection-establishing machine sends a close notification to the connection-accepting machine, which closes its socket upon receipt, and sends an acknowledge back to the connection-establishing machine. Only when the other machine's receipt of the close request is acknowledged does the connection-establishing machine know that no additional data will be sent on the connection, and that that the connection-establishing machine is able to safely close its socket. The respective socket entry is removed from the open socket list on each machine as part of the negotiated closing.

The shared sockets manager also has the ability to send a piece of data at a higher priority than others on that shared socket, so as to enable programs that are aware of shared connections to avoid delay of any urgent communications that may result from sharing a socket with other programs' communications. A prioritizer can extract from the various data transmissions to send those data transmissions which are designated as high-priority, and provide any such high-priority data transmissions to the next layer for transmission before providing the regular priority data.

The various timers, priority handling mechanisms and so forth may be adjusted for each socket, to tune the network machines as desired. For example, a certain machine that exchanges a lot of data with another machine, but at intervals that just exceed a default timeout duration, may set its corresponding timer for this connection to a larger idle socket timeout duration.

Other advantages will become apparent from the following detailed description when taken in conjunction with the drawings, in which:

DETAILED DESCRIPTION

Exemplary Operating Environment

Figure 1:
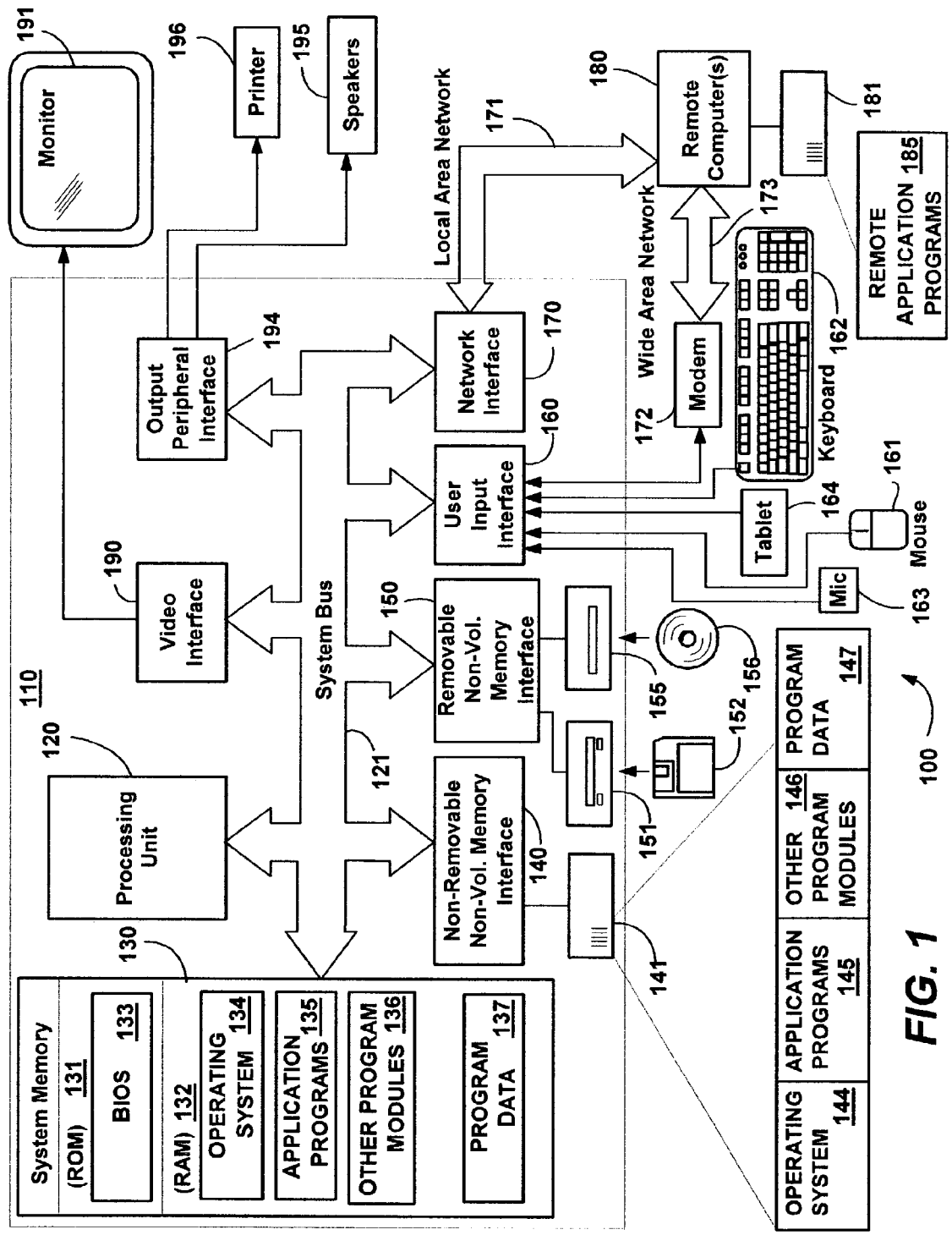
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Shared Socket Connections

The present invention, in part, provides benefits in large networks wherein significant numbers of data transmission requests are made. As will be understood, however, the present invention is not limited to any particular size, type or configuration of network, but rather provides significant advantages and benefits in virtually any computing environment needing data communication. Further, the present invention is described as being an operating system component which receives calls (e.g., through an application programming interface layer) from at least one application program. However, it should be understood that the present invention may be implemented at virtually any level of a computer system at which network transmissions of multiple processes and/or threads may be handled, such as in an application program, incorporated into a low level operating system driver just above the networking hardware, or essentially anywhere in between.

Figure 2:
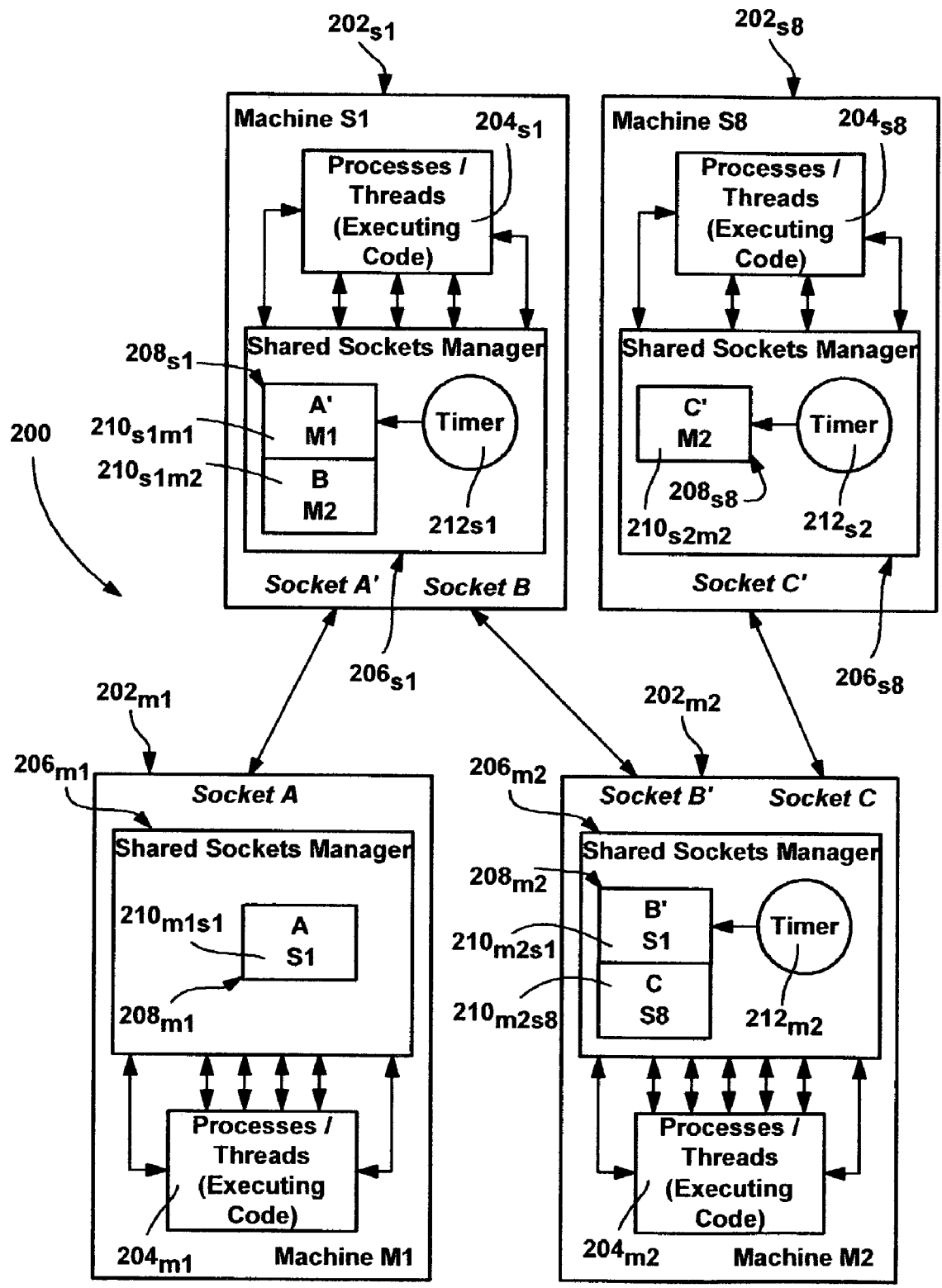
FIG. 2 is a block diagram generally representing a computer network in which the present invention has been incorporated into at least some computer systems of that network.

Turning to FIG. 2 of the drawings, there is shown an example representation of a network 200 having an arbitrary number of computing machines (systems) $202_{s1}$, $202_{s8}$, $202_{m1}$ and $202_{m2}$. Although only four such computer systems are represented in FIG. 2, it is understood that the present invention scales to a much larger number of computer systems, and indeed, with the present invention, networks have been implemented that successfully accomplish needed inter-machine data transfer with machines numbering on the order of five or even ten thousand, given contemporary computing devices and contemporary transmission media. Notwithstanding, no actual upper limit of the number of machines has been determined.

In accordance with an aspect of the present invention, as represented in FIG. 2, each machine $202_{s1}$, $202_{m8}$, $202_{m1}$ and $202_{m2}$ that supports the present invention is arranged to abstract socket management from the applications' and/or other program components' processes and/or threads ($204_{s1}$, $204_{m8}$, $204_{m1}$ and $204_{m2}$) that use the sockets, alternatively referred to herein as the sets of executing code of that system, such that a socket for a connection to any given other machine may be shared by the various sets of executing code. To this end, as described below, a shared sockets manager (e.g., $206_{s1}$,) on each machine (e.g., $202_{s1}$) receives outgoing transmission requests to a destination machine (e.g., $202_{m2}$), determines if a shared socket is already open, and if not, opens one.

In FIG. 2, socket A' represents the open socket used by the machine $202_{s1}$, which corresponds to the open socket A used by the machine $202_{m1}$. As used in FIGS. 2 and 3, the prime (') following the socket designation indicates that the connection was established on the machine having that socket, whereas the absence of the prime indicates that the connection was established at the other machine.

To determine whether a socket is open to a given machine or needs to be opened, as described below, the shared sockets manager (e.g., $206_{s1}$) of each machine tracks its open sockets via a socket list (e.g., $208_{s1}$) comprising a data structure (e.g., $210_{s1m1}$ and $210_{s1m2}$) for each open socket that identifies that open socket by destination machine. Thus as represented in FIG. 2, when the shared sockets manager $206_{s1}$ opens a connection, e.g., via socket A' to socket A of the destination machine $202_{m1}$, the shared sockets manager $206_{s1}$, adds the data structure $210_{s1m1}$ for that open socket to the socket list $208_{s1}$. As described below, in keeping with the present invention, the shared sockets manager $206_{s1}$ combines (multiplexes) data transmissions of the machine's one or more processes/threads $204_{s1}$ to send to the machine $206_{m1}$, so as share the shared socket A' among the set or sets of executing code $204_{s1}$. Similarly, for received transmissions from the machine $202_{m1}$, the shared sockets manager $206_{s1}$ demultiplexes the received transmissions so as to route them to the appropriate one process / thread for which the transmission is destined.

Each socket remains open for the system's executing code to communicate with the other machine for as long as that connection is deemed to be needed. Unneeded connections are determined by an idle duration, which causes the sockets to be closed and removed from their respective lists, in which the idle duration is measured by a timing mechanism, or timer (e.g., $212_{s1}$ in machine $202_{s1}$) that is reset whenever the socket is used. The closing of the connection is not immediate when the idle time is achieved, but rather is negotiated between the machines, as described below. Note that a socket may be closed for other reasons, e.g., via an event indicating that one of the machines is shutting down, or if it appears that the machine at the other socket is behaving improperly (e.g., sending too much data on the socket).

Figure 3:
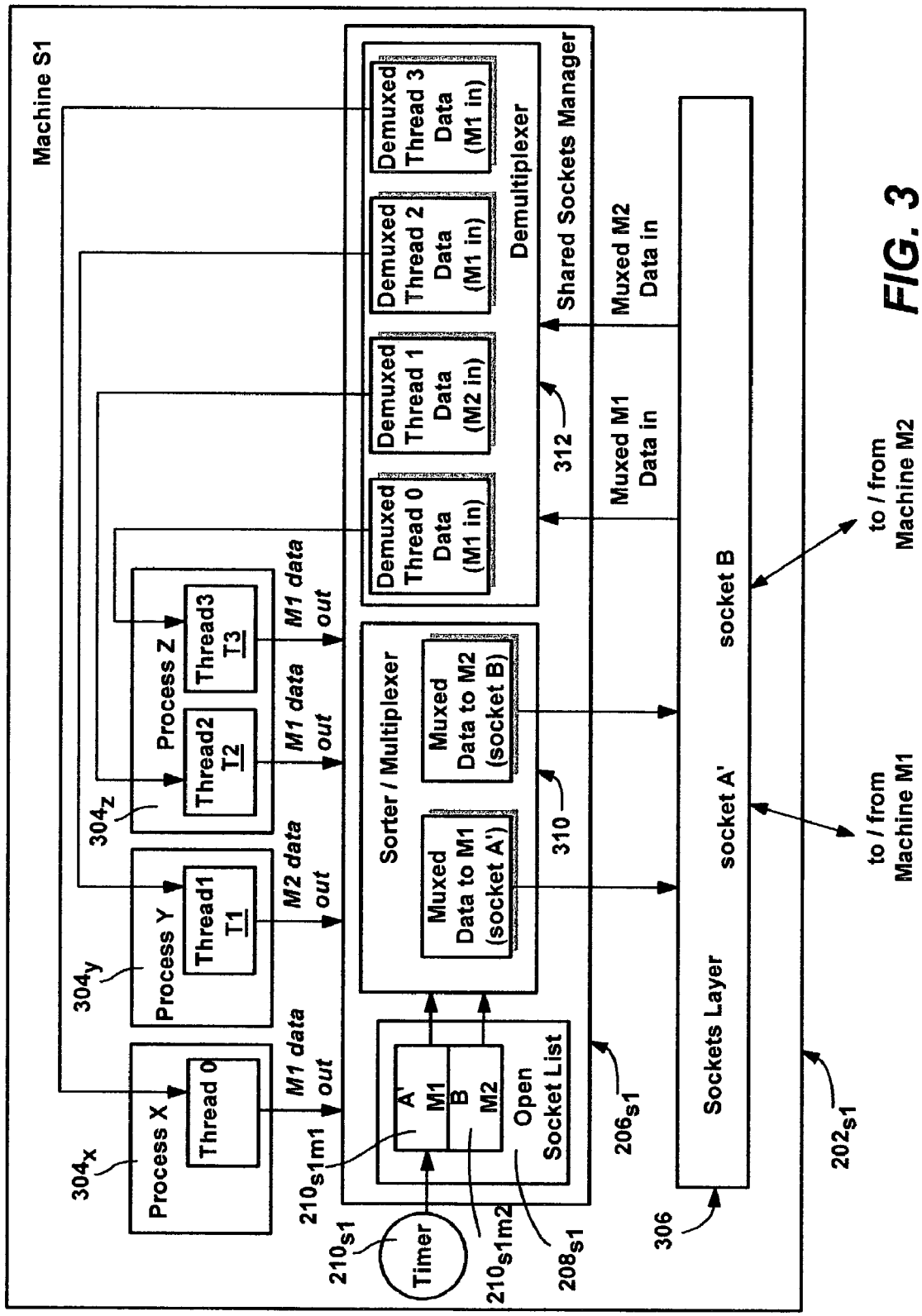
FIG. 3 is a block diagram generally representing components in a computer system configured in accordance with an aspect of the present invention.

FIG. 3 shows the components of the shared sockets manager $206_{s1}$ of the machine $202_{s1}$, that multiplexes transmissions to send from a plurality of threads T0-T3 of processes $304_x$, $304_y$ and $304_z$, (although it is understood that the present invention can operate in an environment that does not have multiple threads per process). One or more of the processes $304_x$, $304_y$ and $304_z$, can be of different application (or other) programs or of the same program. The data to transmit is multiplexed per destination (per shared socket), and is passed to a lower layer (e.g., a sockets layer 306) in a manner that allows the data to be demultiplexed at the destination machine and routed to the appropriate destination process/thread for which it was intended. Similarly, data that is received back from the other machine at a shared socket is demultiplexed and forwarded to the appropriate process/thread for which it was intended. In this manner, on each machine, there is a multiplexer 310 and demultiplexer 312 for handling transmissions to and from shared sockets, respectively.

In one implementation, the shared sockets manager 206 is implemented as a layer on top of the Windows Sockets (WinSock) layer, and comprises code to manage that resource and create an abstraction that provides for better performance, scalability and ease of use. Each connection (communication channel) is an entity that may be shared by multiple threads and processes on a given machine, to send data to and receive data from another individual machine. Internally, there is one shared socket opened per machine-to-machine connection, although there may be more sockets/connections added to any given machine if needed.

Sockets that are accepted on the listening side are also shared, e.g., if another machine calls to establish a connection, (and is in the process of sending data), and the connection is established, the socket is created, and is tracked as being available for shared use by adding a new data structure for that new socket to a list, as described below. In one implementation, a connection is established by the other machine via a receiving request registration mechanism, wherein at the time of startup, shared sockets manager code registers with the operating system to be called if any socket connection is attempted on a specified port number. This code is called when another machine initiates a connection, and includes a function that creates a socket for that incoming receive call, and adds a data structure to an open sockets list (described below), whereby the socket may now be used for sends as well as receives. The operating system is instructed to again call the code for further connection attempts. Once the socket is open, if any data needs to be sent to that machine while the socket is open, (including data from other threads or processes), the shared socket is located and used. The shared socket is also used to receive additional data from the other machine.

Thus, in the example in FIG. 3, the threads T0, T2 and T3 are shown as sending data to the destination machine M1 ($202_{m1}$), and receiving data therefrom, while the thread T1 is shown as sending data to the destination machine M2 ($202_{m2}$) and receiving data back. A sorter/multiplexer component 310 of the shared sockets manager 206 sorts the transmissions by destination, and for each destination multiplexes the data to send, e.g., wraps each send in a structure that allows the data to be sent on one socket to another socket, and demultiplexed at that other socket as if each piece of data was received on its own socket.

The other machines of the network that support the sharing of sockets similarly wrap their data. The shared sockets manager may receive such data from each open shared socket, and processes it via a demultiplexer 312. Essentially, the demultiplexer 312 unwraps the multiplexed data and forwards the appropriate data to the appropriate processes/threads of the executing code sets that are exchanging data over the network.

In accordance with another aspect of the present invention, in order to relate each shared open socket to each other machine, the shared sockets manager $206_{s1}$ maintains a data structure for each open socket in an open sockets list $208_{s1}$, which initially may be an empty list. In the example of FIG. 2, there are two such data structures $202_{s1m1}$ and $202_{s1m2}$ in the list $208_{s1}$, one for open socket A' to and from machine M1 ($202_{m1}$) and one for open socket B to and from machine M2 ($202_{m2}$). When data is requested to be sent to a destination, the list of data structures is searched to determine whether an open socket already exists to that destination, and if so, that existing open socket is used, otherwise one is created. Further, when data is sent or received on a socket, a timer that is incorporated into the data structure and that is used to close idle sockets may be effectively reset, because that socket is not idle. To this end whenever a socket is used, the list of data structures may be accessed to update the time-of-last-use data maintained therein, as described below.

Figure 4:
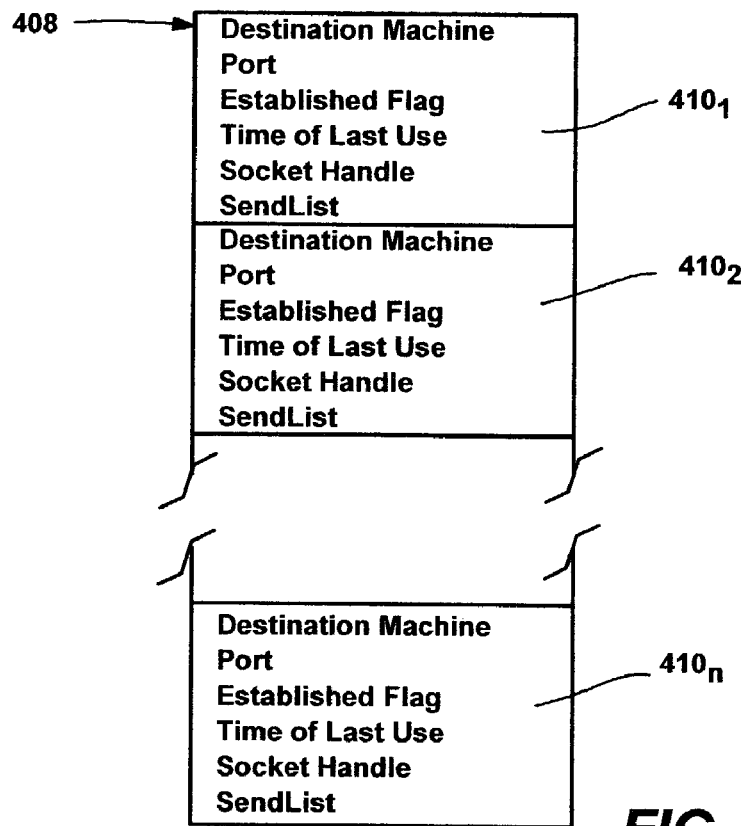
FIG. 4 is a block diagram generally representing a data structure for tracking sockets in accordance with an aspect of the present invention.

FIG. 4 shows the overall structure of one such list of opened sockets 408, having data structures $410_1$-$410_n$ therein. Each data structure represents and tracks the state of an open socket, and as represented in FIG. 4, includes a data field that maintains an identifier of the other machine for which this socket represents the connection, along with a field for port information. Another piece of information is a flag field that indicates whether this machine (the machine that contains this data structure and socket) established the connection, along with a field that tracks the last time the socket was used, and a field for the socket handle.

The sending and receiving of data is internally controlled based on this list of opened sockets 408. Any send or receive accept can place an entry in that list, which may be initially empty until the first send request or accepted connection request causes an entry to be created for the opened socket. Subsequent requests for sending data search this list 408 first to see if a connection has already been established.

In general, the socket is closed when not used for some time, and the close is initiated by the machine that established the connection. For example, a timeout process may be configured to walk the list 408 to check for connections that have not been used for twenty seconds, and if any silent connections are found, they are closed with a negotiation process.

To this end, effective expiration of the timer closes the socket, while use of the socket effectively resets the timer. However, in general only the side that establishes the connection keeps a timer for the socket; the other machine waits for a close instruction from that connection-establishing machine. Note that this is in the typical case, and other, independent timing mechanisms may be employed. For example, in the event that the connection-establishing machine, for whatever reason, does not provide the close request when it should, the other machine will eventually want to close the socket. To this end, another process can occasionally check its list of data structures for sockets having unusually old (relatively) "time-of-last-use" timestamps, and close any such sockets. Sockets can also be checked for being in a frozen state, such as because of a denial of service attack. Further, in addition to closing a socket that is idle beyond some threshold amount of time, a socket may be closed to free up resources if that socket has been opened for too long, and is continuously sending data, to avoid a situation where socket connections are being used while none are being closed, in a manner that places an undue strain on the machine.

As mentioned above, sockets can also be placed on the list 408 as a result of accepting a connection established on another machine that is providing incoming data, thereby creating and opening a socket for that connection. Once opened, data can be sent on that socket as well, including data from any other executing code, not just the recipient process/thread of the initial send that caused the socket to be opened.

Figure 5:
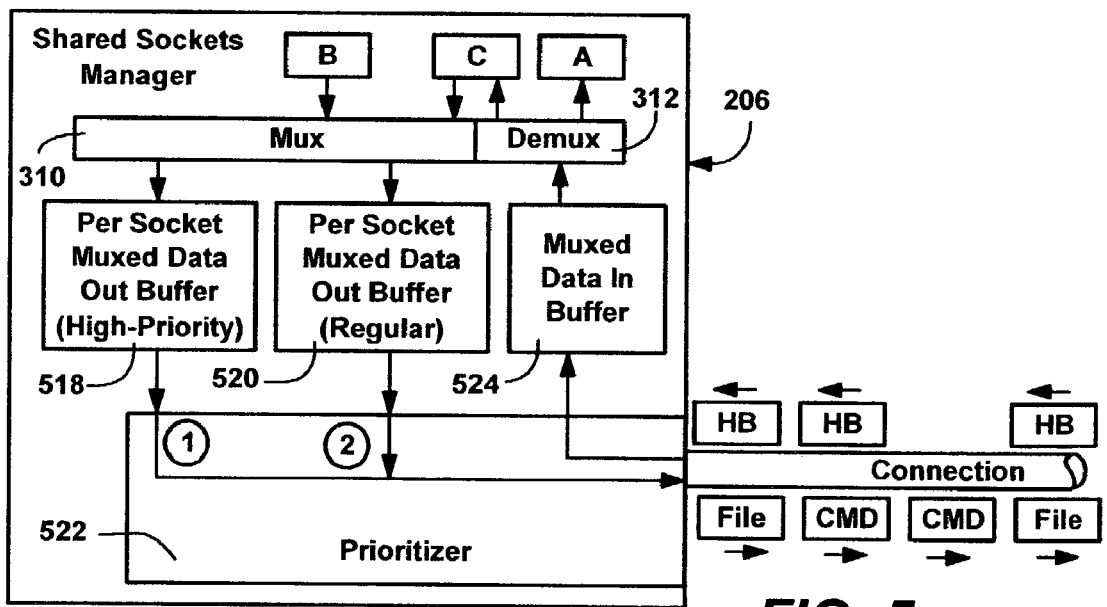
FIG. 5 is a block diagram generally representing components for prioritizing data transmission, in accordance with an aspect of the present invention.

Although not necessary to the present invention, because the shared sockets manager 206 receives a number of transmissions for a given destination and combines them for the same socket, the shared sockets manager has the ability to send a piece of data at a higher priority than others on that channel. For example, as represented in FIG. 5, the shared sockets manager 206 can buffer data (e.g., corresponding to file related data and/or commands) as desired, such as into a high-priority buffer 518 and a regular-priority buffer 520. As can be readily appreciated, there can be other buffers (e.g., a low priority buffer) as well. The ability to specify a priority will help programs that are aware of shared connections to avoid delay of any urgent communications that may result from sharing a socket with other programs' communications. If one connection is not sufficient, multiple connections to the same machine may be opened, with the communications balanced as needed, including, for example, possibly having a reserved high-priority socket. Note that once open, a given application will achieve better performance than what otherwise might be expected because the overhead contemplated for opening a socket is not required.

A prioritizer 522 or the like, which may be incorporated into the shared sockets manager 206 as represented in FIG. 5, (or may be implemented in a layer below), can process (e.g., extract from the buffers and send to the next layer) any high-priority data first, as represented by the circled numeral one (1) in FIG. 5, before any regular priority data, as represented by the circled numeral two (2). Note that instead of multiple buffers there may be only one actual buffer with some indicator of priority with each data set to transmit, such that the prioritizer 522 can walk that buffer extracting data based on priority, as desired. Some limits and/or ratios may be used to ensure that an extensive amount of high-priority data does not cause regular-priority data to get too old before being transmitted. For received data, high-priority data that is in a buffer 524 (or sorted into different buffers based on priority) can also be demultiplexed before other data, if flagged in some manner by the sender as being high priority, and/or if detected at the receiving machine as being a response that corresponds to a previously sent high-priority data transmission.

FIG. 5 illustrates the general concept of the shared connection channel, in which process A is receiving data, process B is sending data and process C is both sending and receiving. Different types of data being sent are represented by the letters in boxes (HB, FILE, CMD), some of which may be high-priority, which the multiplexer 310 can sort out for high-priority handling. As can be seen, sends and receives share the same socket connection across processes to the same destination, with the data multiplexed such that the sending processes can send data on the same socket.

Figure 6:
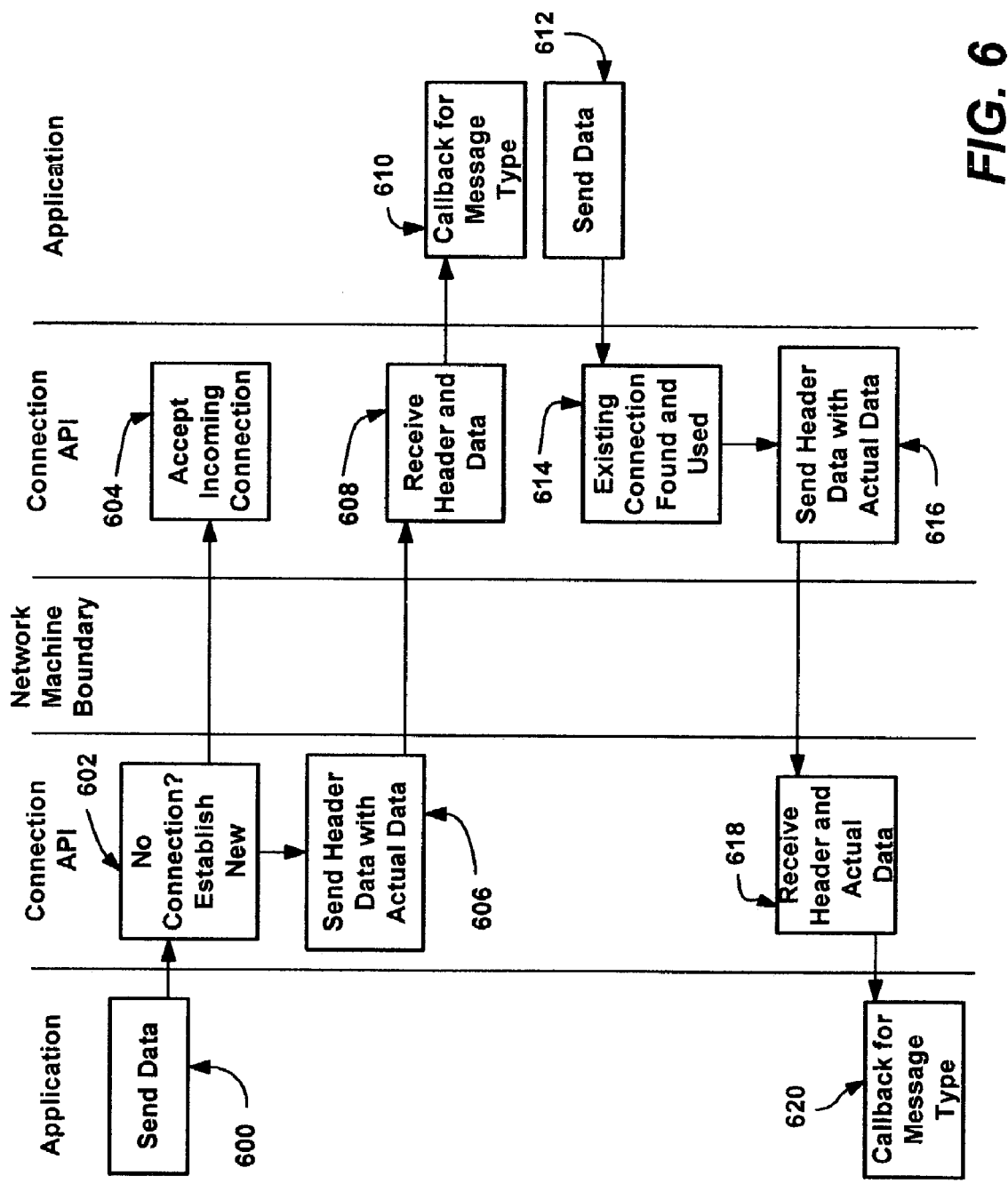
FIG. 6 is a representation of a flow of communication between computer components arranged in accordance with an aspect of the present invention.

FIG. 6 is a representation of the general flow of data between two applications across a network boundary. The flow of data begins at box 600 where an application, (e.g., a process or thread) requests that data be sent. The shared sockets manager 206, for example implemented as a connection API (application programming interface) on the sending machine, may be called by the application directly or indirectly via another API. Note that the underlying complexity of sharing the sockets is hidden by a simple API presented to the application, which only needs to specify the data to send and the destination for its send request. Note that for applications that are not aware of shared sockets, the shared sockets manager can emulate the prior way in which sockets were accessed, e.g., by acting to the program requesting an open as if a new socket is opened when in fact the actual socket is already open, and act to the requesting application program as if a close socket request is satisfied when in fact that socket is left open. Indeed, via the shared sockets manager, access to each socket may be opened and closed from the perspective of a process/thread, even though the socket's actual open or closed state is controlled by the shared sockets manager.

At the box labeled 602, the connection API checks its open sockets list to see whether there is an open socket for a connection to the destination machine. If not, boxes 602 and 604 represent the establishing of a socket at the sender and the accepting of an incoming connection at the destination. Otherwise, the existing connection would be used. Note that in order to share such a streaming socket connection, the destination machine needs the ability for its data transmission process to listen and accept incoming connections, however this ability is already present in conventional, non-shared socket technology. Note that the sending of data is acknowledged, so the sender can be notified asynchronously of a successful transmission, as needed.

In this manner, the first sending of data to a machine where there is no connection initiates the opening up of a connection, along with adding to the open sockets list on each machine an entry to track this particular socket's related information (e.g., other machine identity and socket handle) and state information (e.g., time of last usage). Anytime that a send is requested by either machine, this per-machine list of open sockets searched on the sending machine to see if a connection is already available, (which may be a result of another application's communication), thereby frequently avoiding the overhead of opening a new socket.

For example, continuing with the flow of data in FIG. 6, regardless of whether an existing socket existed or whether one had to be opened, boxes 606 and 608 represents the sending and receiving of the transmitted data respectively, wrapped in a structure having a header that facilitates demultiplexing of the actual data. Box 610 represents sending the demultiplexed data to the appropriate recipient application, which some time later sends data back as represented by box 612. This time, the existing connection is found and used at box 614, wrapped as actual data with a header for demultiplexing. The box 618 represents receiving the header and actual data, which is demultiplexed and sent to the recipient application as represented the box 620.

In accordance with another aspect of the present invention, an idle socket will time out at the machine that established the connection. However, the connection-establishing machine does not simply close its socket, or send a close notification and close its socket, but rather negotiates the closing of the connection with the other machine. This is because the other machine may be sending data at that time. In other words, after a configurable timeout was reached at the machine that established the connection, because a send from the other machine may be in progress at that instant, instead of closing the connection, a close notification is sent as a special request from the connection-establishing machine to the connection-accepting machine. Only when receipt of the close request is acknowledged back is the connection-establishing machine able to be certain that the other machine will no longer be sending data on that connection, at which case the connection-establishing machine can close its socket. In general, the respective socket entry is removed from the open socket list on each machine as part of the negotiated closing.

In order to allow sockets to be shared, a common scheme is to be followed at the sending and receiving ends. This allows for the multiplexing on the send side and the demultiplexing and routing of the data on the receive side. The multiplexing and routing of data is accomplished by sending a routing header (very small relative to typical data transmissions) comprising a message and a client identifier for each actual set of data sent, that identifies the data that belongs to a particular send and its routing information. A unique identifier (e.g., GUID) is assigned to each data send, to identify and help demultiplex data on the receive side.

The structure used for the header is set forth in the table below:

```
typedef struct
{
    OVERLAPPED ol;
    SOCKET socket;
    WCHAR szTargetServerName[MAX_COMPUTERNAME_LENGTH+2];
        // So can match back to our pcs
    WCHAR szServerNameSource[MAX_COMPUTERNAME_LENGTH+2];
    GUID message;
    GUID clientID;
    int OpCode;
    char *pActualBuf;
    u_long ulActualLen; // Used for handling partial receives
    u_long ulSentTotal;
    WSABUF wbuf; // consists of u_long len; char *buf;
    DWORD dwBytes;
    DWORD dwFlags;
    SM_PRIORITY priority;
    SM_NOTIFY notify;
    BOOL bFileTransfer;
    BOOL bEncrypt;
    u_long ulRecvTotal;
    ULONGLONG ullFileSizeRemaining;
        // Fields just for file transfer follow:
    WCHAR szSourceFile[_MAX_PATH+1];
    HANDLE hFile;
    long lDeleteCnt;
} OVERLAPPEDPLUS, * LPOVERLAPPEDPLUS;
```

Figure 7:
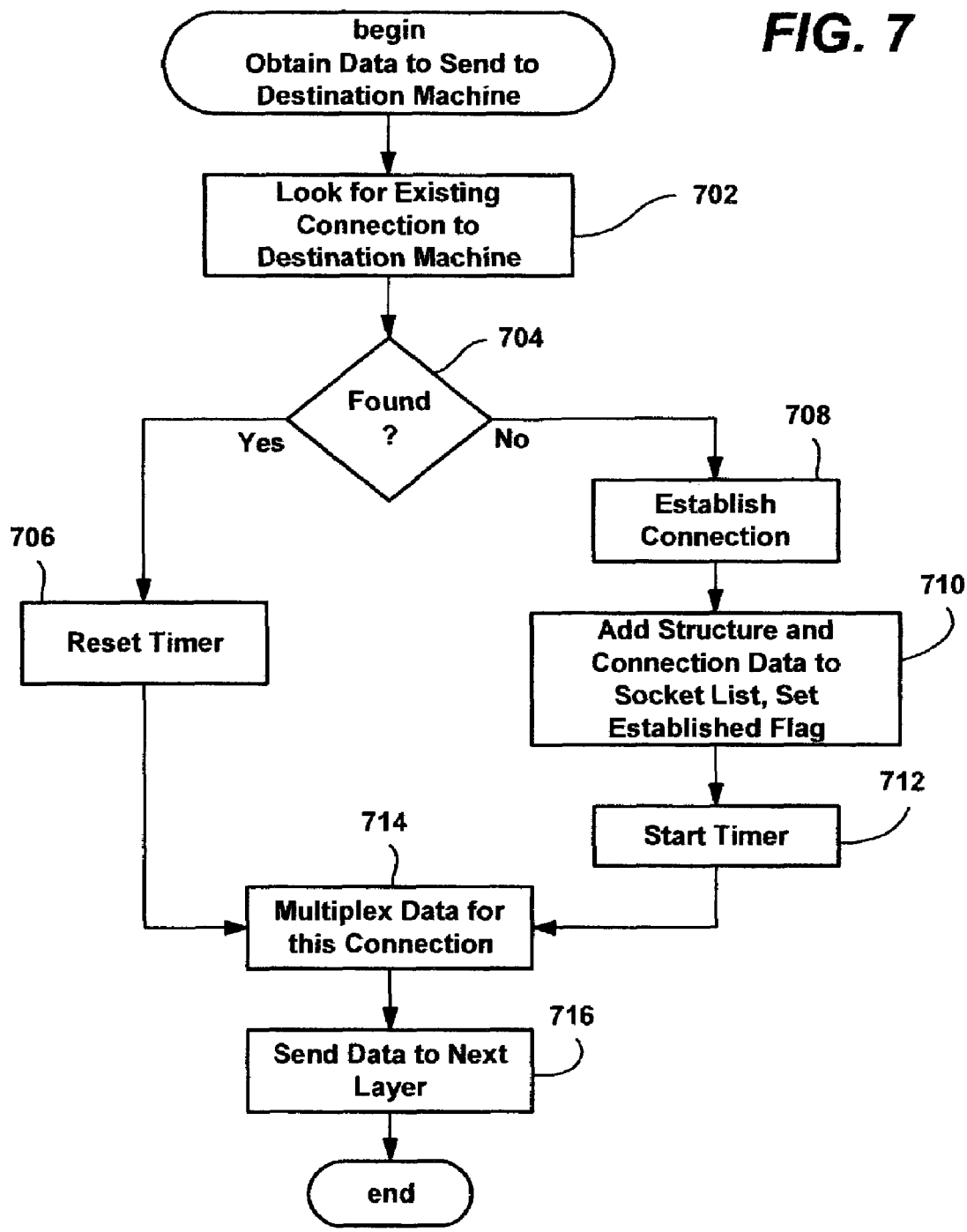
FIG. 7 is flow diagram generally representing a source machine process for transmitting data to a destination machine, in accordance with an aspect of the present invention.
Figure 8:
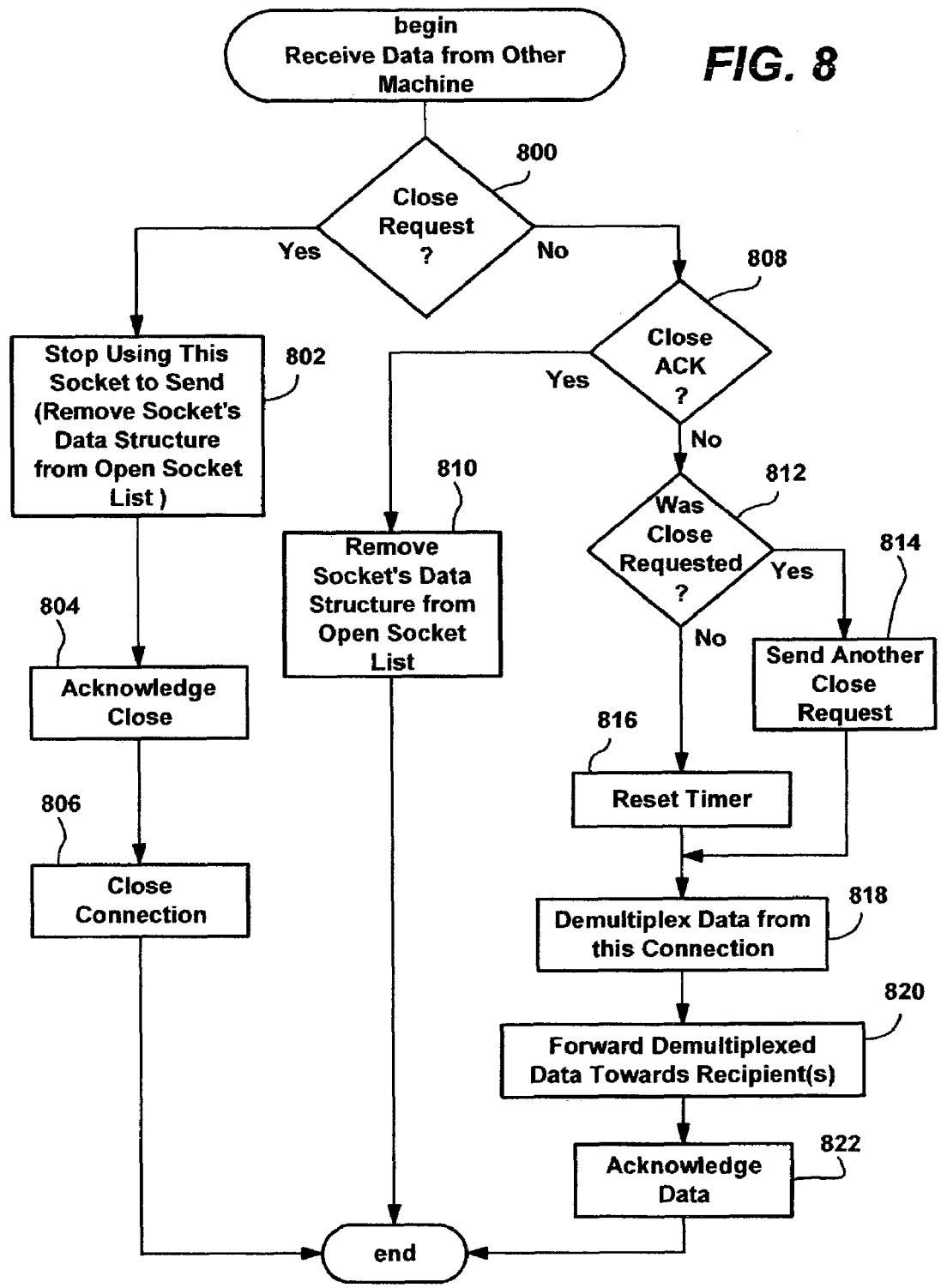
FIG. 8 is flow diagram generally representing a process for handling data received at a destination machine, in accordance with an aspect of the present invention.
Figure 9:
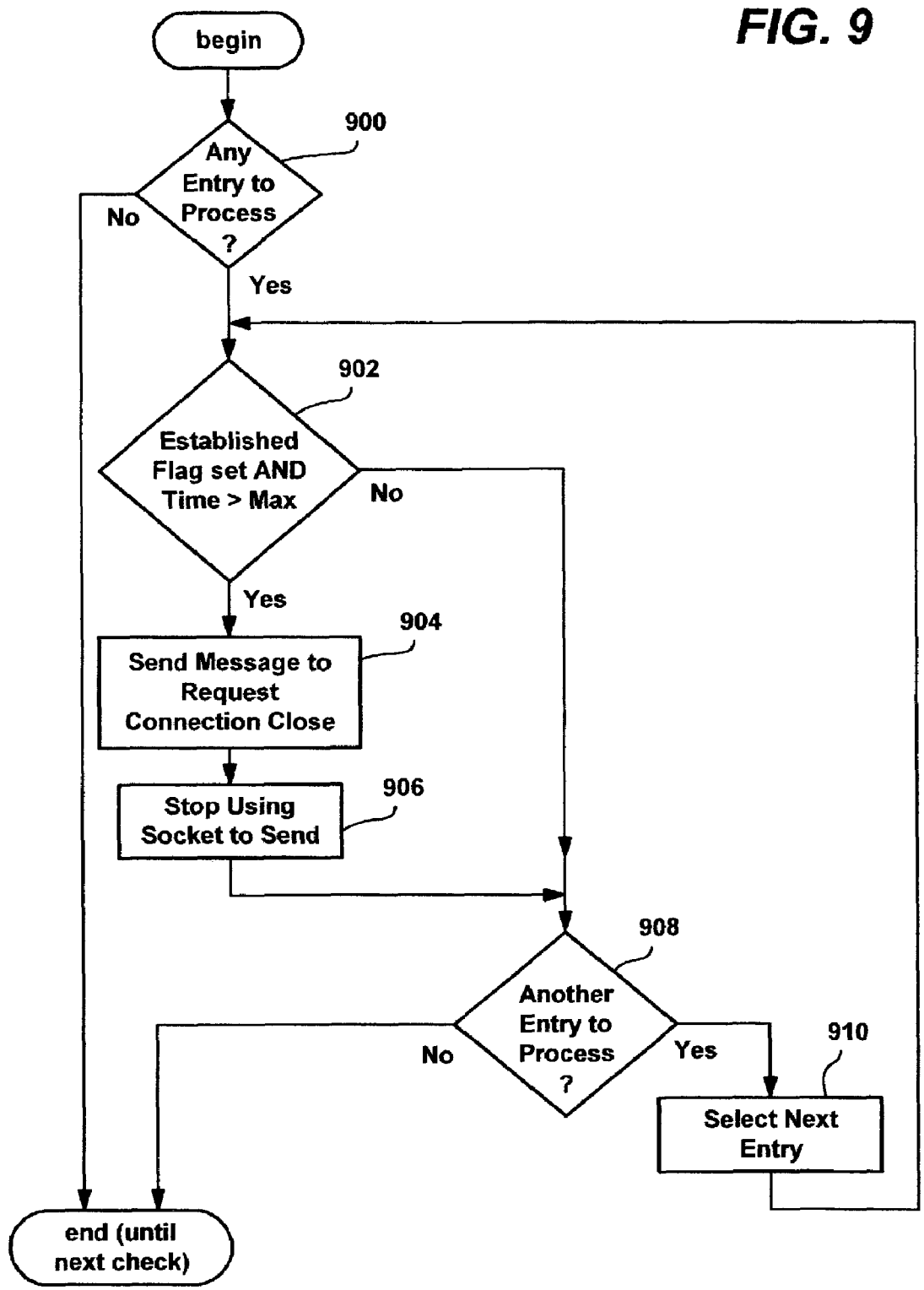
FIG. 9 is a flow diagram generally representing a process for closing sockets in accordance with an aspect of the present invention.

Turning to an explanation of the operation of the present invention with particular reference to the flow diagrams of FIGS. 7-9, FIG. 7 represents how data that is to be sent is handled, beginning at step 702. Step 702 represents searching the open sockets list 408 to determine whether a socket representing an existing connection to the destination machine is open. If found as evaluated at step 704, the process branches to step 706 to reset the timer (e.g., update the time stamp in the data structure), and from there continues to step 714 to multiplex this data with any other data (e.g., from other applications) to send to this connection. As described above, this is essentially performed by adding a small header that describes the data and its routing information to the stream of data to be sent. Step 716 represents sending the data to the next layer, e.g., the sockets layer for transmission. Note that although not shown in FIG. 7, steps 714 and 716 can handle different priority data via suitable buffering mechanisms and the like, as generally described above.

Returning to step 704, if no existing connection was found, step 708 represents establishing a new connection, with step 710 (assuming there were no errors) representing the creation and storage of a data structure 410 in the sockets list 408 for this particular connection. Note that this includes storing the destination identifier, the socket handle, and the port information.

Further, because this machine established the connection, the "established" flag is set, so that the process that looks for sockets to close (that is, those that were established on this machine, as described below with reference to FIG. 9) will know that this connection was established by this machine. Step 712 represents the effective starting of the timer that determines whether this connection is idle, which can be any timer, but in the described implementation corresponds to placing the current time in the "last used time" field in the data structure for this socket. Once the connection is established and the data structure added to the list via steps 708, 710 and 712, the data is multiplexed and sent at steps 714 and 716 as generally described above.

Turning to an explanation of how received data is handled, FIG. 8 represents a receive-handling process when data is received from another machine. Step 800 checks whether the received data corresponds to a close request for this socket. Note that this would handle a situation in which the other machine established the connection, and is now requesting that it be closed. If so, step 800 branches to step 802 to stop using the connection, which can be accomplished by removing the data structure from this list of open sockets, whereby the next send to this machine will first open a new socket. Step 804 represents acknowledging the close request, and step 806 closing the connection. Note that the other machine has not yet closed the connection at its end, awaiting the close acknowledgement, and thus any pending data may be flushed to the other machine (and acknowledged as received) before acknowledging the close at step 804. Alternatively, a new connection may be created for sending such pending data so that the close request can be satisfied without delay.

If the data that was received was not a close request at step 800, it may be a close acknowledge message as evaluated at step 808. Note that this would handle a situation in which this machine established the connection, and had previously requested that it be closed. If so, it is known that the other side closed its connection, and thus step 808 branches to step 810 to close the connection and remove the socket's data structure from the open socket list.

If not a close request at step 800 or a close acknowledge at step 808, the step 812 is executed. Note that data can be received on a connection even after a close was requested, such as if the other machine sent it just before it received the close request (or in the alternative described above, knew of the close request but still had some data to flush). Step 812 tests for whether such post-close request data was received. If so, the data is handled at steps 818, 820 and 822, described below, however the timer is not reset, otherwise a malicious or errant machine could continue to keep a socket open indefinitely by sending data after the close request was received, (because the last used time that caused the close request otherwise would be lost, deceiving a forced close process). Note that the close request may have been lost and consequently not delivered to the sender, and thus a follow-up close request also may be sent (step 814) whenever data is received following a close request. The other machine may re-acknowledge the additional close request, and both machines may be configured to expect multiple close requests or multiple acknowledgements on occasion.

As can be readily appreciated, most of the time a shared connection will not receive a close request or a close acknowledge, but instead will receive regular data transmissions. In such an event, step 812 branches to step 816 to reset the timer, essentially writing a new timestamp into the data structure to indicate that this connection has been used and is to be kept open (under normal circumstances) for at least another time window.

Step 818 represents demultiplexing the received data (whether or not a close was requested), and step 820 represents forwarding the demultiplexed data to the specified recipient or recipients, e.g., application processes or threads, or possibly some intermediate data handling program, such as describe in copending U.S. patent application Ser. No. 10/396,870 entitled "Non-Blocking Buffered Inter-Machine Data Transfer with Acknowledgment," assigned to the assignee of the present application and hereby incorporated by reference. Step 822 represents acknowledging receipt of this data.

FIG. 9 represents the logic for determining whether sockets have been idle for too long. In general, FIG. 9 may be executed periodically, such as some period of time less than the idle connection timeout period, and represents walking the list of open sockets. The timestamps are evaluated for those connections that were flagged as being established on this machine (on which the process of FIG. 9 is running).

Step 900 represents bypassing this logic when the list is empty. If not empty, step 902 represents evaluating the (first) entry to determine whether its established flag is set and whether the time (e.g., the current time minus the last use time) has achieved some maximum threshold value. Note that this maximum value may be a default value or a customized, per socket value, such as for tuning a machine for a particular connection, as described below. If those conditions are not satisfied, step 902 branches to step 908 which, along with step 910, repeats the process on each entry in the list until none remain to be processed.

In the event that the idle connection time has been reached on a connection that was established on this machine, step 902 branches to step 904 to request that the connection be closed. Step 906 represents informing the shared sockets manager to not use this connection to send data, however the connection is not closed at this time, instead being closed upon a close acknowledge (in normal situations). This close request will be handled as described above with reference to FIG. 8.

It should be noted that the various timers, priority handling mechanisms and so forth may be adjusted for each socket, to tune the network machines as desired. The tuning may be for many machines or all machines in the network, or per machine. For example, a certain machine that exchanges a lot of data with another machine, but at intervals that just exceed a default timeout duration, may set its corresponding timer for this connection to a larger timeout duration. This may be historically captured by (or provided to) the shared sockets manager, and/or based on some negotiation between the machines, that is, the tuning may be dynamically managed, by communications between the machines, e.g., so as to negotiate what the timers (e.g., maximum values) are set to, based on likely usage scenarios.

As can be seen from the foregoing detailed description, there is provided a method and system for sharing a socket between processes and/or threads of various programs, that substantially reduces the number of times that connections need to be set up between machines. In general, by multiplexing and demultiplexing data from and to various sources and recipients, and managing the sockets representing the connection on which the data is transmitted, the present invention facilitates communication between large numbers of networked machines. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing machine within a computer network, a method of sharing data communication sockets, the method comprising:
    a socket manager maintaining a list of open data communication sockets;
    the socket manager receiving a request from a computing process for transmission of data to a destination computer within the computer network;
    the socket manager reviewing the list of open data communication sockets;
    the socket manager determining, after having reviewed the list of open data communication sockets, if a socket is open to the destination computer;
    when a socket is open to the destination computer, the socket manager providing that socket to the computing process for transmission of the data requested to be transmitted to the destination computer;
    when a socket is not open to the destination computer, the socket manager opening a socket to the destination computer, providing that socket to the computing process, and
    adding the opened socket to the list of open data communication sockets;
    adding header data to the data requested to be transmitted from the computing process to the destination computer through a socket, the header data enabling multiplexing by a sending system and enabling demultiplexing by a receiving system and the header data being maintained in an OVERLAPPEDPLUS structure; and
    keeping a socket open to the destination computer for a lapse of time after communications to the destination computer have ceased.

2. The method of claim 1 wherein the header data comprises data enabling multiplexing and demultiplexing data intended to be sent from one or more computing processes, through one socket, to more than one computing process.

3. The method of claim 2 wherein the socket manager multiplexes data sent from one or more computing processes, through one socket, to more than one computing process.

4. The method of claim 3 further comprising a prioritizer wherein high priority data to be sent over a socket may be sent before lower priority data to be sent over the same socket.

5. The method of claim 1 wherein the socket manager receives data from a sending computer, processes the header data, and demultiplexes the data.

6. The method of claim 1 further comprising a timer wherein the lapse of time for keeping a socket open is determined by the timer and after the lapse of time the socket manager closes the open socket.

7. The method of claim 1 wherein the lapse of time may be terminated and a socket closed upon the socket manager receiving a close request from a computer process.

8. The method of claim 1 wherein the socket manager receives the request for transmission of data from a computing process executing within a computer other than the computer where the method is being performed.

9. A computer program product comprising a computer readable storage medium storing computer executable instructions that, when executed, implement the method of claim 1.

10. The computer program product of claim 9 wherein the header data comprises data enabling multiplexing and demultiplexing data intended to be sent from one or more computing processes, through one socket, to more than one computing process.

11. The computer program product of claim 10 wherein the socket manager multiplexes data sent from one or more computing processes, through one socket, to more than one computing process.

12. The computer program product of claim 11 further comprising a prioritizer wherein high priority data to be sent over a socket may be sent before lower priority data to be sent over the same socket.

13. The computer program product of claim 9 wherein the socket manager receives data from a sending computer, processes the header data, and demultiplexes the data.

14. The computer program product of claim 9 further comprising a timer wherein the lapse of time for keeping a socket open is determined by the timer and after the lapse of time the socket manager closes the open socket.

15. The computer program product of claim 9 wherein the lapse of time may be terminated and a socket closed upon the socket manager receiving a close request from a computer process.

16. The computer program product of claim 9 wherein the socket manager receives the request for transmission of data from a computing process executing within a computer other than the computer where the method is being performed.

17. A computing system comprising a process and memory the memory having computer-executable instructions stored thereon, which, when executed by the processor, implements the method of claim 1.

18. The system of claim 17 wherein the header data comprises data enabling multiplexing and demultiplexing data intended to be sent from one or more computing processes, through one socket, to more than one computing process.

19. The system of claim 18 wherein the socket manager multiplexes data sent from one or more computing processes, through one socket, to more than one computing process.

20. The system of claim 19 further comprising a prioritizer wherein high priority data to be sent over a socket may be sent before lower priority data to be sent over the same socket.

21. The system of claim 17 wherein the socket manager receives data from a sending computer, processes the header data, and demultiplexes the data.

22. The system of claim 17 further comprising a timer wherein the lapse of time for keeping a socket open is determined by the timer and after the lapse of time the socket manager closes the open socket.

23. The system of claim 17 wherein the lapse of time may be terminated and a socket closed upon the socket manager receiving a close request from a computer process.

24. The system of claim 17 wherein the socket manager receives the request for transmission of data from a computing process executing within a computer other than the computer where the method is being performed.

* * * * *